United States Patent [19]

Vora

[11] 3,785,417
[45] Jan. 15, 1974

[54] CUTTERHEAD WITH REPLACEABLE INSERTS

[75] Inventor: Prabodh Mohanlal Vora, Beloit, Wis.

[73] Assignee: The Black and Decker Manufacturing Company, Towson, Md.

[22] Filed: Feb. 18, 1972

[21] Appl. No.: 227,473

[52] U.S. Cl................. 144/221, 29/105 R, 144/230
[51] Int. Cl............................................. B27g 13/04
[58] Field of Search.......................... 29/105 R, 108; 408/197; 144/218, 221, 230

[56] References Cited
UNITED STATES PATENTS
3,635,574  1/1972  Schiller............................ 29/105 X
3,588,976  6/1971  Dupuis et al...................... 29/105 X
3,688,367  9/1972  Bennett............................... 29/105
2,600,651  6/1952  Hogg et al. ...................... 408/197 X FOREIGN PATENTS OR APPLICATIONS
1,369,473  7/1963  France................................ 144/218
2,446,490  5/1947  Switzerland......................... 29/105
528,883    4/1957  France................................ 29/105

Primary Examiner—Andrew R. Juhasz
Assistant Examiner—W. R. Briggs

[57] ABSTRACT

A rotary cutting tool for cutting material surfaces such as wood or metal. The cutting edges comprise a plurality of replaceable inserts held in place by an improved clamping mechanism. In an extended length version such as would be used for finishing a wide surface, a plurality of straight inserts are mounted side by side in an approximation of a helical pattern.

2 Claims, 6 Drawing Figures

PATENTED JAN 15 1974 3,785,417

CUTTERHEAD WITH REPLACEABLE INSERTS

This invention is directed to an improved cutterhead for a surface finishing and shaping machine and particularly realtes to improvements in the manner of locating cutting edges in the cutterhead.

BACKGROUND

Previously known rotary cutterhead include a generally circular or cylindrical body adapted to be mounted on a rotary shaft. The head also includes a plurality of cutting edges mounted on the body and extending in a suitable configuration to perform the desired cutting operation.

The cutterheads taught by the prior art have attempted to achieve a variety of objectives including more efficient cutting, improved finish on the workpiece, simplified and less expensive clamping mechanisms and, more recently, reduced noise. However, the various cutterhead systems previously proposed have been found to fail in meeting one or more of these objectives. For example, many previous clamping mechanisms require the presence of deep pockets in the assembled cutter, thus causing loud siren noise which may be harmful to the operator. Other clmaping mechanisms hav been subject to failure, thus permitting the release of the cutting elements with consequent damage or injury; still others require complex and difficult alinement procedures to accurately position the cutting edges.

A further difficulty has been encountered in the particular field of planer heads of extended length. In this operation, it has been found that the use of a spiral blade positioned along a helix on the cutterhead provides substantially improved cutting together with reduced noise. However, the provision of extended spiral blades, particularly of carbide, is expensive. Approximations which have previously been attempted have either failed to be sufficiently close to a helix to provide the desired advantages or have produced other difficulties which may be even more undesirable. For example, a simple shear-cut slot design is limited to a relatively short length because the hook angle or radial rake angle increases with increase in body length. It has also been suggested to produce such heads in sections, any number of which may be mounted on a shaft but these cutters have been found to be insufficiently rigid and subject to run-out inaccuracies.

OBJECTIVES OF THE PRESENT INVENTION

The primary purpose of the present invention is the provision of an improved rotary cutterhead incorporating a simple, accurate blade clamping mechanism which avoids the hazards, complexities and noise problems of the prior art. In addition, it is a primary purpose of this invention to provide an extended length cutterhead construction which can readily be produced in any desired length without encountering the difficulties of the prior art.

Accordingly, it is an object of the present invention to provide a unique clamping mechanism for cutting edges in a rotary cutterhead which provides accurate rigid and safe operation without undue cost.

It is another object of this invention to provide an improved clamping mechanism for cutting edges in a rotary cutterhead which enables simple, accurate cutting edge renewal.

It is also an object of this invention to provide an improved rotary cutterhead which defines a substantially helical cutting edge by means of a plurality of straight cutting inserts.

It is also an object of this invention to provide an improved rotary cutterhead which is substantially less noisy in operation than previous cutterheads.

Further objects and advantages of this invention will become apparent as the description and illustration thereof proceed.

IN THE DRAWINGS

Figure 1:
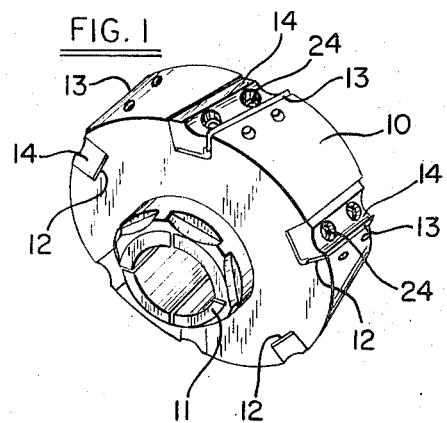
FIG. 1 is a perspective view of a rotary cutterhead in accord with the present invention.

In FIG. 1, a rotary cutterhead in accord with the present invention is illustrated which includes a cutter body 10. The body 10 is adapted to be mounted on a dirve shaft, not shown, by means including nut 11 in accord with conventional practice. Other types of drive mechanisms might be substituted therefor. In the circular circumference of the cutter body 10, a plurality of slots 12 are provided, each of which is adapted to receive a cutting blade 13 and a blade-locking wedge or gib 14. In the illustrated head, the axial length of the cutting edge may for example be approximately 2 inches.

Figure 2:
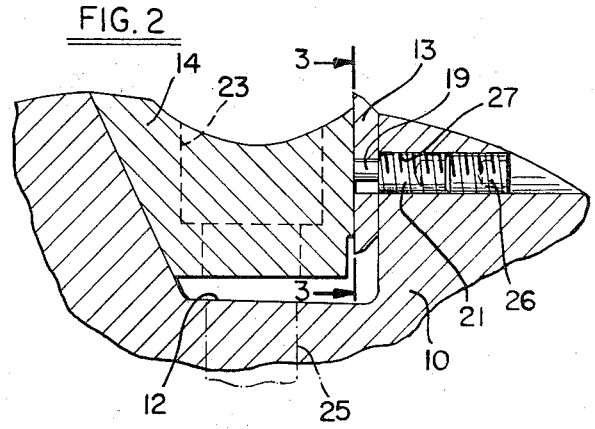
FIG. 2 is a cross sectional view taken along the lines 2—2 of FIG. 1.
Figure 3:
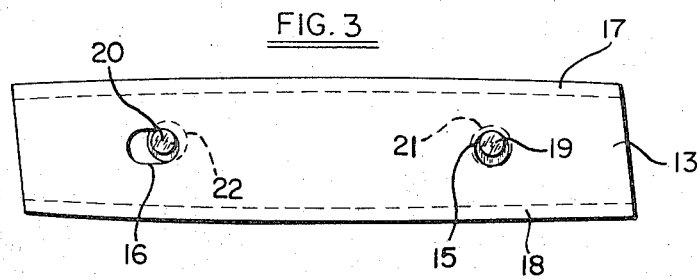
FIG. 3 is a cross sectional view taken along the lines 3—3 of FIG. 2.

FIG. 2 illustrates a cross sectional view through a slotted portion of the cutter and shows in detail the relative location of the gib and blade in the slot 12, while FIG. 3 illustrates the full width of the blade in the head. The blade 13 may be fabricated from any suitable material such as high speed steel, but the present invention is particularly well suited for use with carbide blades of the type well known in the industry. The particular blade 13 used in this instance is provided with a circular hole 15, an elongated hole 16 and two cutting edges 17, 18 which are very precisely located during manufacture of the blade with respect to the holes 15, 16. The blade is mounted in place via holes 15, 16 on cams 19, 20 which are eccentrically mounted on the ends of screws 21, 22. The blade is retained in place by the gib 14 which is provided with a pair of suitable apertures 23. A pair of screws 24, shown in FIG. 1, are threaded into sockets 25 in the cutterhead 10.

This manner of locating the blade and fixing it in place is a particular feature of the present invention. Specifically, the provision of holes 15, 16 and the precise location of cutting edges 17, 18 relative to these holes permits very accurate and repeatable positioning of the blades in the cutterhead by means of the cams 19, 20. The cams are smaller in diameter than the holes 15, 16, and as screws 21, 22 are adjusted, the cams raise and lower the respective ends of the blade until it is accurately positioned. Once the edge 17 is accurately aligned, lock screws 26 are threaded into the bores 27 to secure the screws 21, 22 against further movement. Thereafter, accurate edge renewal may be accomplished by simply removing the gibs 14 and inverting the blade or substituting a new blade once both edges have been used. Extremely accurate alignment of the blade is made possible by virtue of the use of two locating points 15, 16. In addition, the accuracy of this construction is substantially increased in comparison to prior art usage of cam pins since the cutting force and the gib action both are in a direction to seat the blade tightly on the cams rather than lift it away from the cams. Also it is noted that the adjusting surfaces act directly on the blade. This increases the accuracy of edge location and, when wrecks do occur, only the blade must be replaced rather than a complex locating system.

Several other advantages also accrue to this construction; Specifically, the blades are retained securely within the cutter by the cams even though the gib should loosen slightly. Thus, the operator is protected against the danger of a blade flying out of the cutter at high speed. A further advantage of this construction is the fact that the pockets previously referred to which produce siren noise during cutter operation are substantially reduced and may be almost completely eliminated by simply placing a piece of tape in the relieved surface of the gib after the assembly has been completed.

A less obvious advantage of the present construction is that this construction, in contrast to many prior art arrangements, includes vertically arranged sockets 23 and 25 which require that the gib 14 be completely removed from the slot before the blade can be changed or inverted. This forces the operator to remove chips, etc. which might be present in the area of the blade. The possibility that he will simply slip a new blade into a narrow opening over a sufficient quantity of chips, dust, etc. to subsequently cause blade breakage when the gib is tightened, as is permitted by prior art arrangements, is eliminated. Also, by virtue of this construction, the gib 14 and screws 24 cannot be put in place unless the blade has been properly mounted on cams 19 and 20. Again, this reduces the possibility of blade breakage which might occur if the operator were to attempt to force the blade into place by tightening the gib with the blade slightly misaligned. However, the most significant advantage of this construction is that of quick and inexpensive blade change without need for readjustment of the locating mechanism and without any need for regrinding the blade edges after replacement or inversion.

Figure 4:
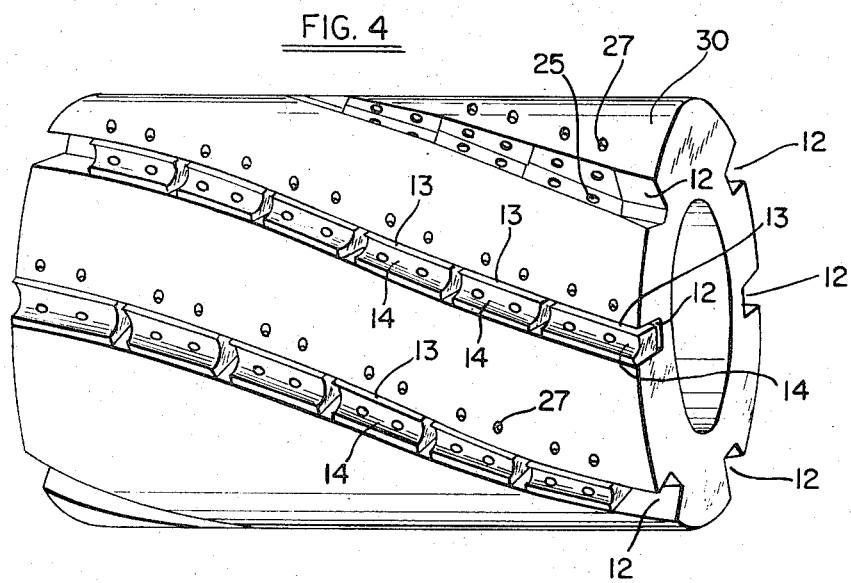
FIG. 4 is a perspective view of an elongated cutterhead constructed in accord with the present invention.

FIG. 4 illustrates an elongated rotary cutterhead in accord with the present invention, for example such as might be used in a planing operation on a wide wooden surface. As can be seen in this view, the cutterhead 30 includes a plurality of slots 12, all but one of which contains a plurality of blades 13 and gibs or wedges 14. The upper slot has been left empty to show the sockets 25 and bores 27. Each blade-gib combination is mounted in exactly the same manner as has been previously described; thus, the advantages noted previously for the single-blade-width cutter also pertains to the cutter shown in FIG. 4. It is also noted that the blades in alternate rows are mounted in staggered relationship so that the small space left uncut between adjacent blades in each row is cut by the blade edge at the corresponding axial location in the next row. (The space shown in FIG. 4 is exaggerated for clarity.) Also, this arrangement enables a cutterhead of any desired length to be manufactured even though the blades are of standardized length. This arises from the fact that the relative position of the blades in each row can be controlled during manufacture so as to adjust the overall length to any selected value.

The cutterhead of FIG. 4 also embodies a further significant feature of this invention, namely, an improvement in the construction of a helical cutter edge. It is well known in the cutting art that several improvements in the efficiency, cut quality and noise level of a cutting operation can be achieved by providing a helical cutting edge on the cutterhead, rather than the straight, paraxial edge which has previously been used. However, as noted in the introductory portion, difficulties have been encountered with the several known methods of attempting to provide such a cutting edge.

In accord with the present invention, a series of straight blades of the type shown in FIG. 3 are mounted in suitable slots milled into the surface of the cutterhead so as to approximate the desired helix. Thus, the necessity of twisting a blade into a helical shape is avoided; at the same time, the manner of approximating the helix is substantially improved as compared to the techniques previously attempted.

Figure 5:
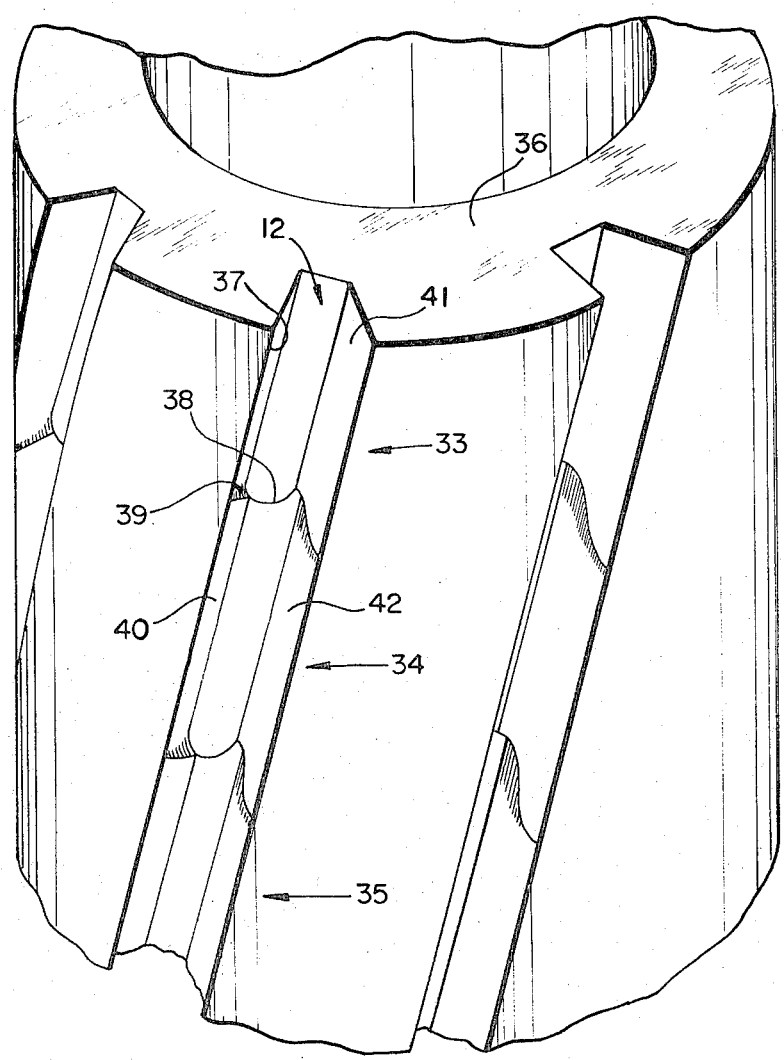
FIG. 5 is a perspective view of the cutter body of FIG. 4 shown at an intermediate stage of manufacture.
Figure 6:
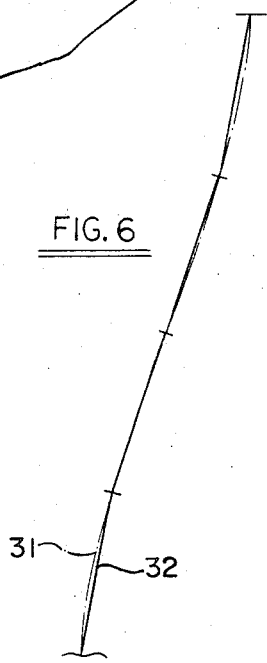
FIG. 6 is a schematic view illustrating the principle used in constructing the cutterhead of FIG. 4.

The specific construction by which this is achieved is illustrated in FIGS. 5 and 6. FIG. 6 shows a true helix 31 as it would appear on the surface of the cylindrical body 30. Superimposed on this helix 31 is an approximation 32 formed by a series of straight lines. As appears from this illustration, the two lines are very much the same. In fact, the length of the straight line segments in FIG. 6 has been exaggerated; the actual situation on a cutter body is even closer to the true helix.

FIG. 5 shows a portion of the cutter body 30 including only the first three segments; in essence, the segmental regions 33, 34 and 35 are straight line slots corresponding to the segments of approximation 32. The segments are produced so as to approximate a helical slot in the same manner as line 32 approximates line 31. In the view of FIG. 5, two successive milling operations of this type have been performed. In the first, a straight end mill has entered end 36 and produced the flat blade-side 37 of the segment 33. This flat end is sufficiently long to receive a blade 13. The end of the first pass is indicated by the cutterhead radius 38 and cutter sweep 39. The mill is then withdrawn and the cutterhead is rotated relative to the mill to the position required for the next straight segment. The mill is then moved into the body and traversed to form the flat 40 in segment 34. This operation is continued to the end of the body.

Because each of the individual segments are straight and because they run at an axial rake angle across the cutter, an adjustment in height is necessary to accommodate the blade to the changing raidal distance to the top of the slot. This is accomplished by varying the depth of the cut slightly across the length of each straight segment and by appropriately grinding the cutter edge of the blade. In fact, the blade 13 shown in FIG. 3 is shaped for this purpose. The varying depth of the end mill from one end of each straight segment to the other is illustrated by the appearance of radius 38 in FIG. 5.

After the series of straight segments on the blade-side 33 have been completed, a second cutter is introduced at the gib-face side of the slot. This cutter is also moved in a series of staggered straight line segments in the manner shown in FIG. 6 to produce a similar approximation of a helix comprising the flats 41, 42, etc. Because both sides of the slot 12 consist of a series of straight line segments, both the blade and the gib can be fabricated with flat surfaces and simply dropped in place in the respective straight segments, thus eliminating the need to fabricate these parts with matched helical or curved surfaces. After milling the slots in this manner, or by other suitable means, the apertures for the gib-mounting bolts and for the blade-locating screws are drilled and tapped and these respective parts are mounted, each in a manner described in connection with FIGS. 1–3.

It can be seen from the foregoing description and drawings that a cutterhead construction in accord with the present invention provides numerous advantages as compared to the constructions previously available. The extended length cutterhead illustrated in FIG. 4 and 5 provides a cutting edge which is a very close approximation to a true helix without encountering the difficulties of twisting carbide or of matching widely staggered or independently mounted blade edges. In addition, in both the extended length and single element embodiments, an improved blade clamping system is provided which enables accurate positioning of the locating members to permit simple replacement of the blades. During placement of the blade and during operation of the cutter, the forces acting on the blade are such as to retain the blade precisely on the locating surfaces of the cam screws, thus providing maximum assurance that the accuracy will be maintained.

As an alternative embodiment, it is noted that the blade locating points might also comprise a pair of straight edges provided on the back surface of the blade, one of which would contact an appropriate locating surface in the same manner as illustrated in FIGS. 2 and 3. However, this embodiment does not retain the added safety provided by the extension of the cams through openings in the blade which prevents the blade from being thrown out of the head. Therefore, the illustrated embodiment is a significant improvement and is preferred.

A further advantage of the construction of this invention is a function of the small space left between adjacent blades in a given helical row. This assists in chip breakage and prevents the formation of chips as wide as the cutting blade. Thus, this is an additional feature of the subject invention.

Although a limited selection of embodiments of this invention have been illustrated and described in the foregoing specification, it will be clearly understood by those skilled in the art that many changes and modifications may be made therefrom without departing from the essential concept of this invention. For example, the described construction may be adapted to a variety of cutterheads in both the metal and wood working fields without sacrificing the essential features of this invention. Accordingly, it is intended that the appended claims cover all such changes and modifications as may fall within the true spirit and scope of this invention.

I claim:

1. A cutter head for rotary cutting machines comprising a cylindrical cutter body; a straight slot in said body, said slot being disposed at an angle to the axis of said body; a replaceable cutting blade in said body, said blade having an exposed first cutting edge extending above the cylindrical surface of said body; said blade including a second cutting edge disposed within said body; wedge means in said slot for retaining said blade against one side of said slot, said wedge having an aperture therein; bolt means for securing said wedge in said cutter body; and a plurality of independently adjustable cam means spaced in said cutter body in a direction parallel to said exposed first cutting edge, each of said cam means comprising screw threaded means mounted in said cutter body and having an eccentric projection extending into said slot; said blade including apertures for receiving said eccentric projections.

2. A cutter head for rotary cutting machines comprising a substantially cylindrical body, a plurality of slots in the surface of said body; each of said slots comprising a plurality of straight line segments, said segments being angled relative to adjacent segments so that each of said slots approximates a helix; a plurality of blades, each of said blades comprising a straight cutting edge, said cutting edges having a length equal to that of said segments; wedge means for mounting each of said blades in said segments; and a plurality of independently adjustable eccentric projections extending from said cutter body into engagement with each of said blades whereby each of said blades has at least two independent eccentric projections associated therewith for adjustment of said cutting edge.

* * * * *